(12) United States Patent
Sosnin et al.

(10) Patent No.: US 11,681,010 B2
(45) Date of Patent: Jun. 20, 2023

(54) MEASUREMENTS AND REPORTING FOR USER EQUIPMENT (UE) POSITIONING IN WIRELESS NETWORKS

(71) Applicant: Apple Inc., Cupertino, CA (US)

(72) Inventors: Sergey Sosnin, Zavolzhie (RU); Alexey Khoryaev, Nizhny Novgorod (RU); Mikhail Shilov, Nizhny Novgorod (RU); Sergey Panteleev, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/264,506

(22) PCT Filed: Jul. 31, 2019

(86) PCT No.: PCT/US2019/044396
§ 371 (c)(1),
(2) Date: Jan. 29, 2021

(87) PCT Pub. No.: WO2020/028517
PCT Pub. Date: Feb. 6, 2020

(65) Prior Publication Data
US 2022/0113365 A1    Apr. 14, 2022

Related U.S. Application Data

(60) Provisional application No. 62/713,419, filed on Aug. 1, 2018.

(51) Int. Cl.
*G01S 5/02* (2010.01)

(52) U.S. Cl.
CPC ............. *G01S 5/0273* (2013.01); *G01S 5/02* (2013.01); *G01S 5/0268* (2013.01)

(58) Field of Classification Search
CPC .......................... G01S 5/0273; G01S 5/0268
USPC .......................... 701/300; 342/450; 343/867
See application file for complete search history.

(56) References Cited

U.S. PATENT DOCUMENTS

| 7,616,965 | B2 | 11/2009 | Rudravaram et al. | |
| 7,880,684 | B2* | 2/2011 | Schantz | H01Q 3/24 |
| | | | | 343/867 |
| 2010/0090890 | A1 | 4/2010 | Wirola et al. | |
| 2013/0030684 | A1* | 1/2013 | Wirola | G01S 5/0289 |
| | | | | 701/300 |
| 2014/0210663 | A1* | 7/2014 | Metzler | G01S 19/07 |
| | | | | 342/357.34 |
| 2014/0349582 | A1 | 11/2014 | Xiao et al. | |

FOREIGN PATENT DOCUMENTS

EP    2773973 B1    5/2017

OTHER PUBLICATIONS

International Search Report and Written Opinion of the International Searching Authority directed to related International Patent Application No. PCT/US2019/044396, dated Nov. 15, 2019, 10 pages.

* cited by examiner

*Primary Examiner* — Bo Fan
(74) *Attorney, Agent, or Firm* — Sterne, Kessler, Goldstein & Fox P.L.L.C.

(57) ABSTRACT

Methods, systems, and storage media are described for the measurement and reporting of user equipment (UE) positioning in cellular networks. Other embodiments may be described and/or claimed.

17 Claims, 13 Drawing Sheets

```
                            ┌─────────────────────────────┐
                            │ Retrieving, from memory,    │
                            │ configuration information   │
                            │ that a user equipment (UE)  │
              100           │ is to use to perform a      │
                            │ multi-path channel          │
                            │ component measurement       │
                            │            105              │
                            └──────────────┬──────────────┘
                                           ▼
                            ┌─────────────────────────────┐
                            │ Generating a message that   │
                            │ includes the configuration  │
                            │ information                 │
                            │            110              │
                            └──────────────┬──────────────┘
                                           ▼
                            ┌─────────────────────────────┐
                            │ Encoding the message for    │
                            │ transmission to the UE      │
                            │            115              │
                            └──────────────┬──────────────┘
                                           ▼
                            ┌─────────────────────────────┐
                            │ Receiving, from the UE, a   │
                            │ multi-path channel          │
                            │ component measurement       │
                            │            120              │
                            └──────────────┬──────────────┘
                                           ▼
                            ┌─────────────────────────────┐
                            │ Determining a position of   │
                            │ a virtual reference source  │
                            │ based on the multi-path     │
                            │ channel component           │
                            │ measurement                 │
                            │            125              │
                            └──────────────┬──────────────┘
                                           ▼
                            ┌─────────────────────────────┐
                            │ Determining a position of   │
                            │ the UE based on the         │
                            │ position of the virtual     │
                            │ reference source            │
                            │            130              │
                            └─────────────────────────────┘
```

FIG. 1

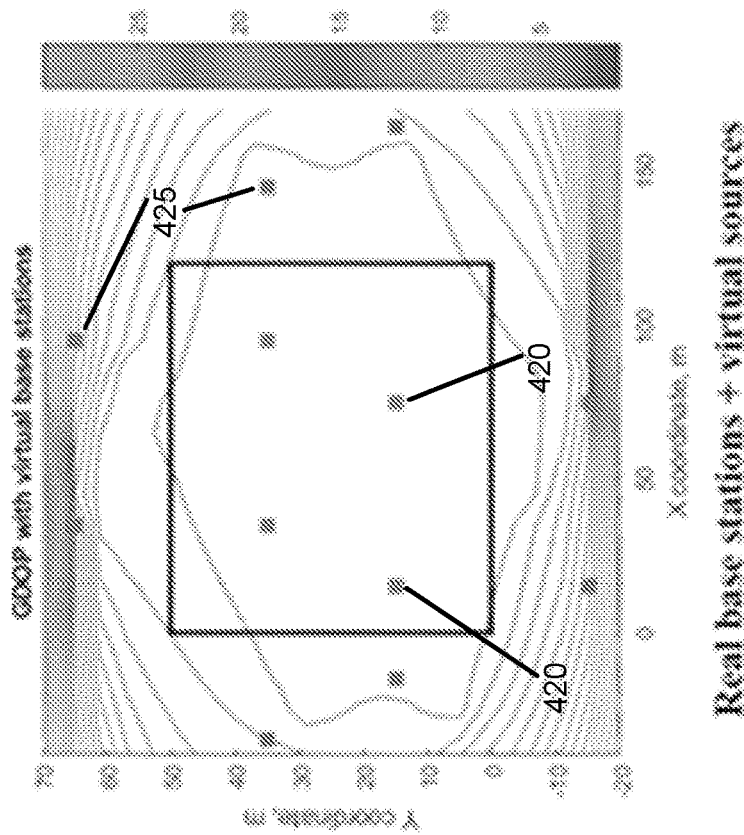
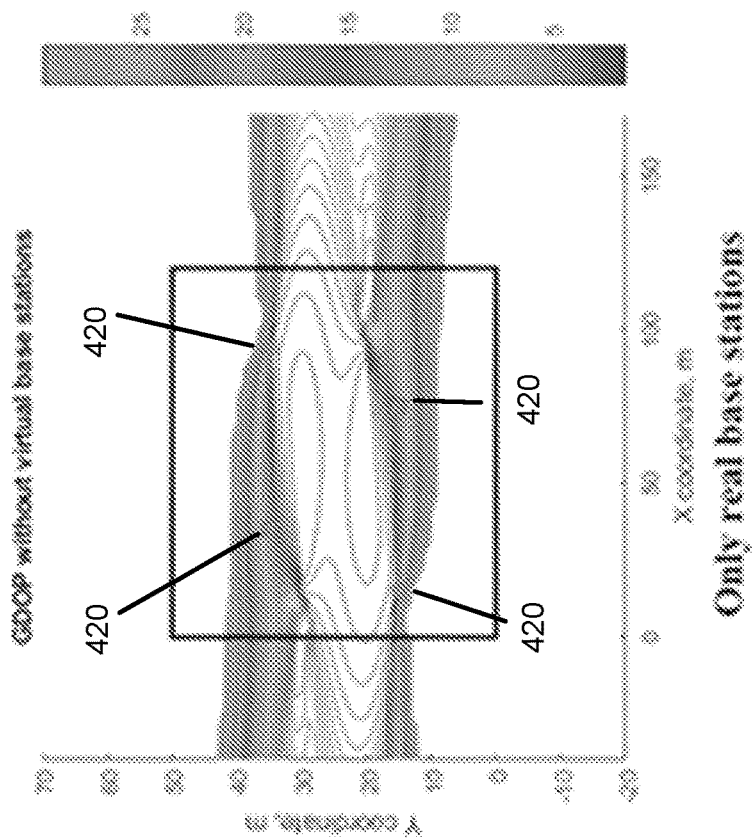
FIG. 4D

MEASUREMENTS AND REPORTING FOR USER EQUIPMENT (UE) POSITIONING IN WIRELESS NETWORKS

CROSS REFERENCE TO RELATED APPLICATION

The present application is a U.S. National Phase of International Application No. PCT/US2019/044396, filed Jul. 31, 2019, which claims priority to U.S. Provisional Patent Application No. 62/713,419, filed Aug. 1, 2018, entitled "MEASUREMENTS AND REPORTING FOR USER EQUIPMENT (UE) POSITIONING IN WIRELESS NETWORKS," the entire disclosures of which are hereby incorporated by reference in their entirety.

BACKGROUND

Among other things, embodiments described herein may include enhanced methods of user positioning in wireless communication networks. Embodiments of the present disclosure may be applicable to next generation cellular systems such as, for example, 3GPP LTE and 3GPP NR, as well as other communication networks.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 1 and 2, and 3 illustrate examples of operation flow/algorithmic structures in accordance with some embodiments.

FIG. 4D illustrates an example of GDOP enhancements in an indoor scenario with four base stations inside a building in accordance with some embodiments.

DETAILED DESCRIPTION

Figure 2:
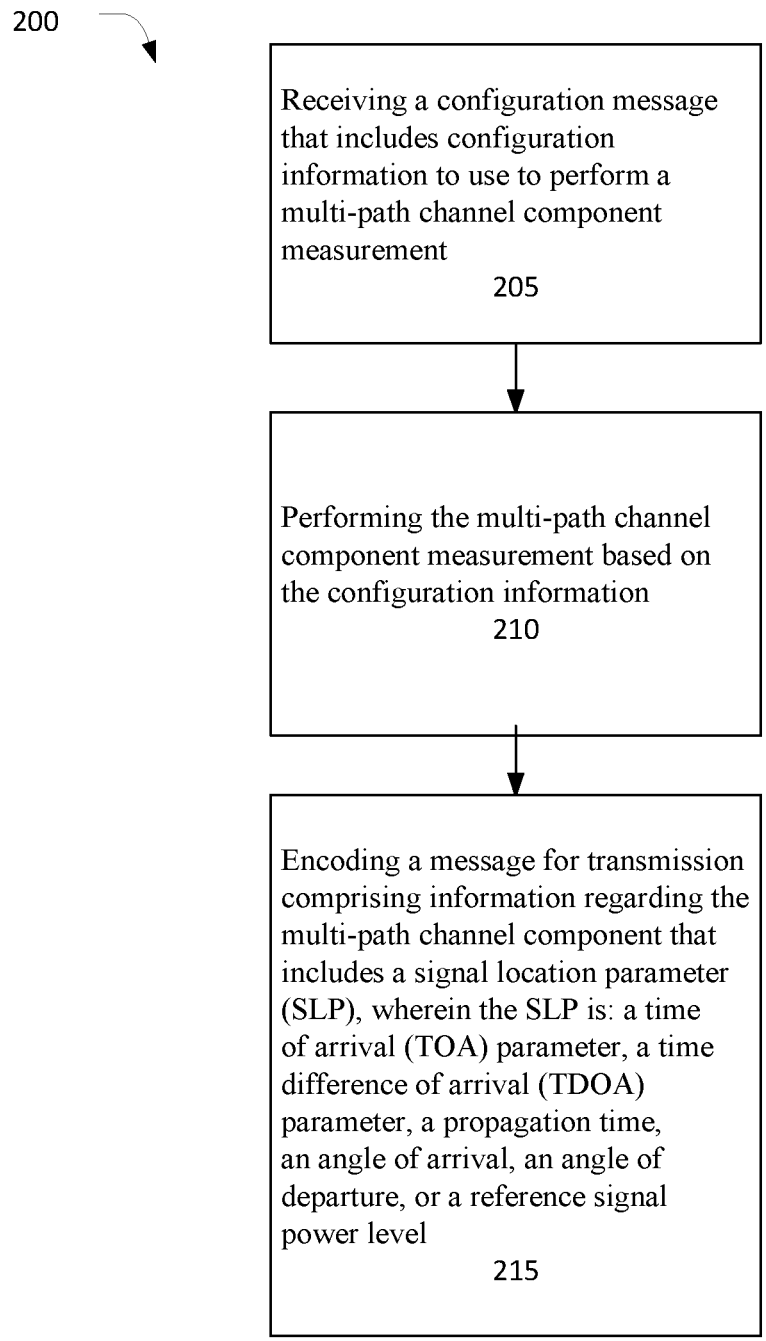

Embodiments discussed herein may relate to determining UE positioning in wireless networks. Other embodiments may be described and/or claimed.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in various embodiments," "in some embodiments," and the like may refer to the same, or different, embodiments. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Examples of embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

Examples of embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

UE Positioning in Wireless Networks

Embodiments herein may be applicable to any type of wireless communication network. Embodiments herein may aim to improve the accuracy and reliability/confidence of user location for general scenarios and for specific cases with limited number of reference nodes or a bad GDOP (Geometric Dilution of Precision) of reference nodes. Embodiments herein may enhance positioning measurement reporting structure for utilization of additional node telemetry parameters and positioning measurement for multiple channel components, e.g., line-of-sight (LOS)/non-LOS (NLOS), between a Base Station (BS) and a user. Embodiments herein may signal additional location measurements to increase the user location reliability for general scenarios and for scenarios with limited number of reference nodes or bad positioning geometry.

Embodiments herein may include positioning algorithms to take measurements of Signal location parameters (SLP) from reference sources only for LOS channel component (i.e. first arrival path) and use this measurement for location procedure. In addition to the Observed Time Difference Of Arrival (OTDOA) positioning approach, embodiments herein may include additional assistance information that can be made available to network such as information collected from various sensors (e.g. information about acceleration vector and its magnitude, velocity vector and its magnitude, etc.). This additional information can significantly improve accuracy of UE positioning if it is signaled.

Another problem addressed by embodiments herein may be for scenarios with limited number of reference nodes. For instance, in indoor scenarios and especially considering signal propagation at higher carrier frequencies there may be limited number of traditional SLP measurements that can be used in location procedure due to limited number of the detected reference stations. In this case it may be possible to extract additional information from multipath channel components that can be used to improve location capabilities in certain scenarios.

Previous systems have a number of drawbacks, including:
Performance is very sensitive to the number of base stations involved in the positioning procedure.
Performance is very sensitive to the relative position of the reference nodes due to well known problem of geometric dilution of precision ("bad geometry of reference nodes").
Current signaling protocols do not provide sufficient complementary signaling that can benefit positioning. For instance data from various sensors (sensoric information) can be processed and signaled in order to maximize the location performance by using different recursive filtration techniques such as Kalman filtration and more accurately track UE position.

Enhanced UE measurements and reporting discussed in embodiments herein can advance location capabilities of cellular networks and provide more accurate locations for users especially in challenging environments. Embodiments herein may provide a concept how this enhancement can be done and what additional SLP data may be used. For example, embodiments herein may:

Increase wireless IP portfolio.
Increased accuracy of user location by using cellular wireless communication networks.
Improve performance in scenarios with limited number of positioning reference nodes or bad geometry.
The following terms may be used in the disclosure.
Signal location parameters (SLP)—parameters of the signal that can be applied for the purpose of user positioning such as phase difference, time of arrival (TOA), time difference of arrival (TDOA), propagation time/delays, angle of arrivals/departures, received reference signal powers and any other information that can be relevant to facilitate estimate of UE geographical coordinate.

Positioning reference signals (PRS)—the signals sent by transmission points e.g. cells/eNB/gNB/TRPs/Network Entities and used to measure SLP which knowledge is beneficial for UE location. It could be specifically designed sequences and signals with good cross and autocorrelation properties or any data transmission depending on implementation and measurement and reporting type.

Beam—a beam may represent beamformed transmission or reception of the signal and it can be applied to analogue (RF), digital baseband (BB), or hybrid beamforming approaches. In the context of this disclosure, beam represents either resource (resource set) or antenna port index of the reference signals that can be used for estimation of signal location parameters including but not limited to synchronization signals (SS), e.g., Primary Synchronisation Signal (PSS)/Secondary Synchronisation Signal (SSS) PSS/SSS SS Block (SSB)), channel state information-reference signal (CSI-RS) signals, sounding reference signal (SRS), random access channel (PRACH) or dedicated positioning reference signals (PRS).

Impact of Kalman Filtration on Positioning Capabilities

Embodiments herein may include a different recursive filtration techniques aiming to track user position to accurately estimate user location. For instance the Kalman filtering may be based on an accurately known the system model. From positioning perspective, additional parameters such as for example UE speed (velocity vector) may be known to the network/positioning entity.

Figure 4A:
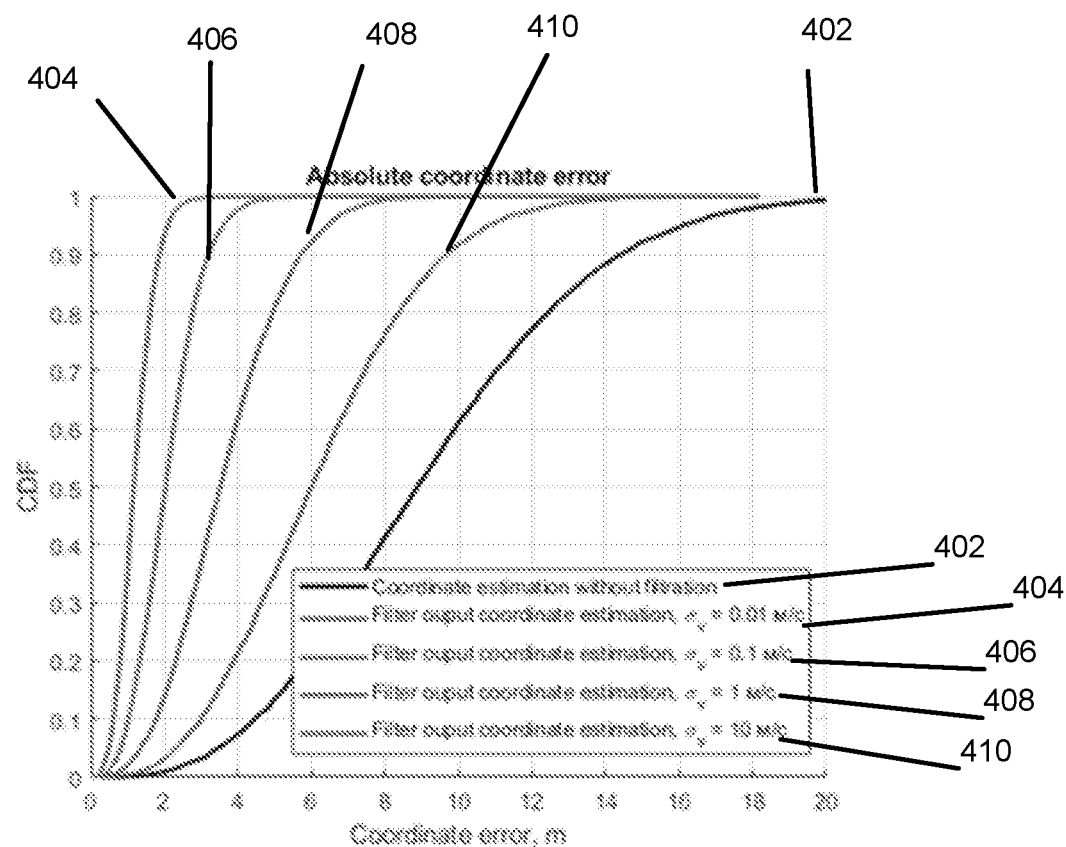
FIG. 4A illustrates an example of location accuracy improvement using Kalman Filtration in accordance with some embodiments.

FIG. 4A shows an example of UE location accuracy depending on the accuracy of UE speed. Accurate knowledge of UE speed can provide much better performance, comparing to the basic scenario where speed information is not taken into account. If user coordinate estimation has a variance of 10 m (curve 402) the additional Kalman filtering can significantly decrease the positioning error if accurate values of the speed are provided to positioning entity.

Assuming different positioning use cases and different node types for positioning (pedestrian UE, vehicle UE, drone UE, etc.) different data can be used to enhance location accuracy applying modern filtering approaches (e.g. via recursive filtration procedure based on Kalman theory, etc). Therefore, on top of existing signaling specified in LTE Positioning Protocol (LPP)/LTE Positioning Protocol A (LPPa) and NextGen Positioning Protocol A (NPPa), embodiments herein may use additional signaling to collect geo-location information available from other sensors (such as accelerometers, speed meters, inertial measurement units, etc.).

Examples of geo-location information may include:
Physical Coordinate Information
    In 2D or 3D format and represented in any system of coordinates (e.g. local or global coordinate systems, cartesian or spherical, etc): longitude, latitude, altitude (and the sign of latitude, altitude) and metric characterizing their uncertainty/error or distance traveled.
    In absolute or relative (differential) form with respect to reference point and values from the previously reported time instance.
Velocity Vector Information (absolute or relative with respect to reference point)
    In 2D and 3D format and represented in any system of coordinates (e.g. local or global coordinate systems, cartesian or spherical, etc) including horizontal and vertical velocity/speed and metric characterizing their uncertainty/error.
    In absolute or relative (differential) form with respect to reference point and values from previously reported time instance.
Acceleration Vector Information
    In 2D and 3D format and represented in any system of coordinates (e.g. local or global coordinate systems, cartesian or spherical, etc) including horizontal and vertical acceleration and metric characterizing its uncertainty/error.
    In absolute or relative (differential) form with respect to reference point and values from previously reported time instance.
Direction of Travel
    3 dimensional movement direction.
    3 dimensional gyroscope measurements for 3D space orientation.
Timestamp Information
    In predefined time-stamp format with relative or absolute time stamp values
Inclinometer data (tilt measurement)
Altitude sensor data (e.g. barometer data)
Magnetometer data
Different weather condition sensors (pressure, water, temperature, etc.)
Different control parameters like driving wheal rotation (for vehicles), engine traction for drones and etc.
Performance Limiting Factors Typical location algorithms usually utilize all measurements of SLP for LOS channel component to estimate user location. The accuracy of user location depends on many factors. Embodiments herein may address issues such as:
    Limited number of base stations/transmission points involved into UE positioning (hearability problem).
    Geometric Delution of Precision (GDOP)—poor geometry of reference nodes/transmission points.
Amount of Base Stations Typical algorithms utilized for location procedure based on multilateration concept, which may use at least 3 base stations for 3D location procedure based on TOA measurements and at least 4 base stations for 3D location procedure based on TDOA measurements.

Figure 4B:
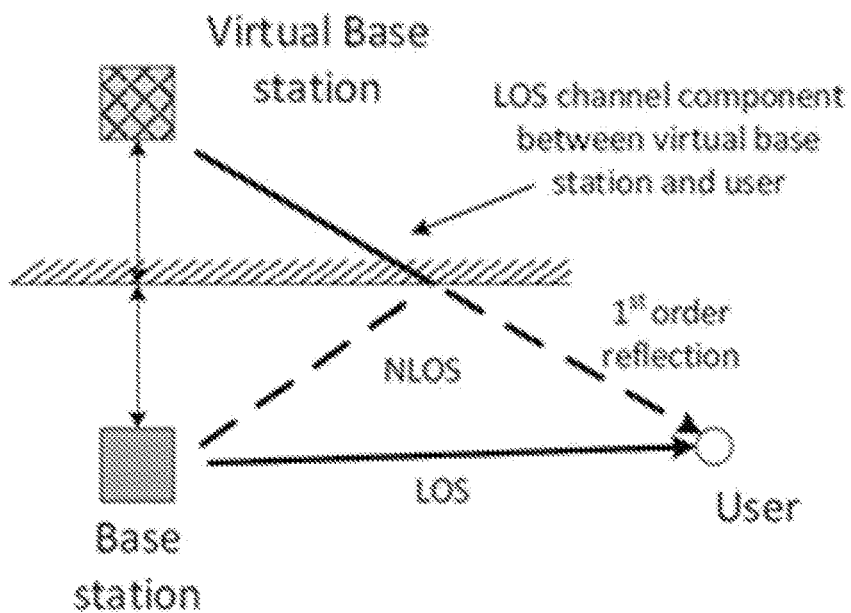
FIG. 4B illustrates an example of a first order reflection and a virtual base station in accordance with some embodiments.

If network topology is known (e.g. map of the building and location of the TRPs inside building) then it may be possible to utilize the second order information collected from the channel impulse response.
Concept of Virtual Reference Sources FIG. 4B illustrates an example of a propagation channel between a base station and a user with two path components (direct path and reflected path/tap). Each of the channel paths has its own SLP (Propagation delay, Angle of arrival, etc.). The second channel tap is formed due to reflection of emitted signal from the surface, from another hand, this reflected signal can be seen as a signal transmitted by the virtual reference node, which coordinate is defined by the reflection surface geometry and the real base station position. Assume that the user is capable of estimating the SLP for each component. In this case it can be possible to estimate the SLP from real TRP and virtual node, which means that instead of a single measurement from one reference node, the particular user has two measurements for one real transmission point and one virtual transmission point.

Figure 4C:
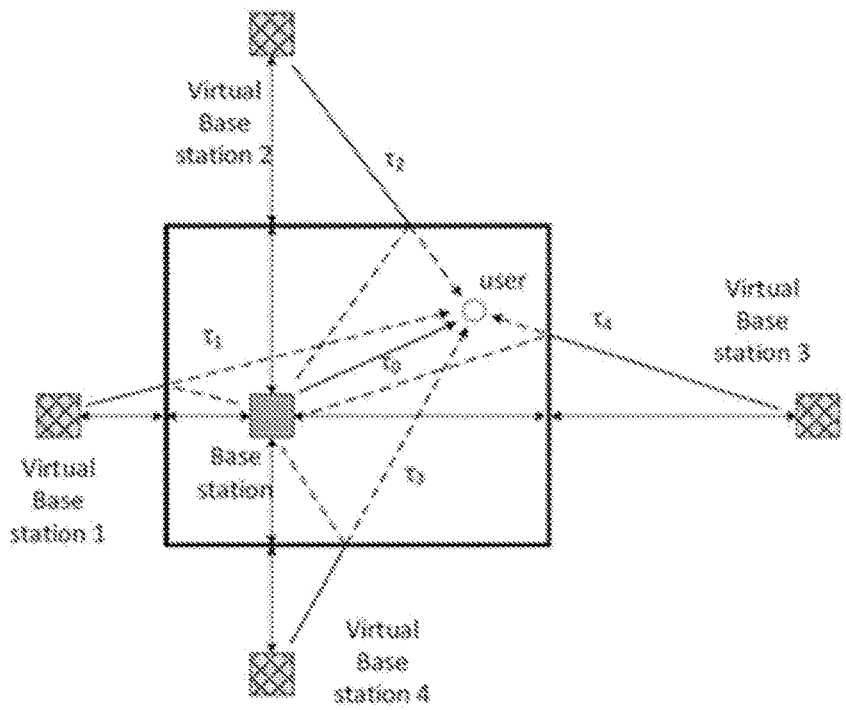
FIG. 4C illustrates an example of enhanced positioning with multi-path measurements and virtual sources in accordance with some embodiments.

FIG. 4C illustrates the capability of user positioning enhanced with multipath measurements. Assume that current indoor scenario contains only one base station that transmits PRS. Also, it is assumed that user is capable to estimate TOA for LOS component—τ0 and for TOA measurements for the 1st order reflected channel paths as—τ1-τ4. Additionally, it may be possible to know/determine the coordinates of virtual sources (i.e. first order reflectors), which are going to be used in localization procedure. This problem can be solved by different ways, examples of the virtual node location determination will be provided in following section. The current set of assumptions lead to the situation when using only TOA measurements from the single base station it is possible to accurately estimate a user's coordinates.
Influence of Bad Geometric Dilution of Precision One more negative factor that affects location accuracy is the GDOP. GDOP can be described as a value of location error variance which depends on relative location of user and reference points/base stations. FIG. 4D represents the influence of virtual base stations on resulted GDOP for standard 3GPP indoor scenario with 4 micro base stations. The location of real base stations is marked by the inner four squares 420, while the outer eight squares 425 represent virtual base stations. It is shown that the location accuracy for users that are allocated not far from the vertical walls in the indoor environment without virtual nodes is worse than for the case where the virtual nodes are used for positioning. In other words, the utilization of NLOS channel components can significantly reduce the GDOP problem in indoor environments.
Virtual Reference Node Coordinate Determination The following options provide solutions for the calculation of coordinates for virtual reference sources that can be used in location procedures in embodiments of the present disclosure.
Case 1—Known Geometry (Map)

Figure 4E:
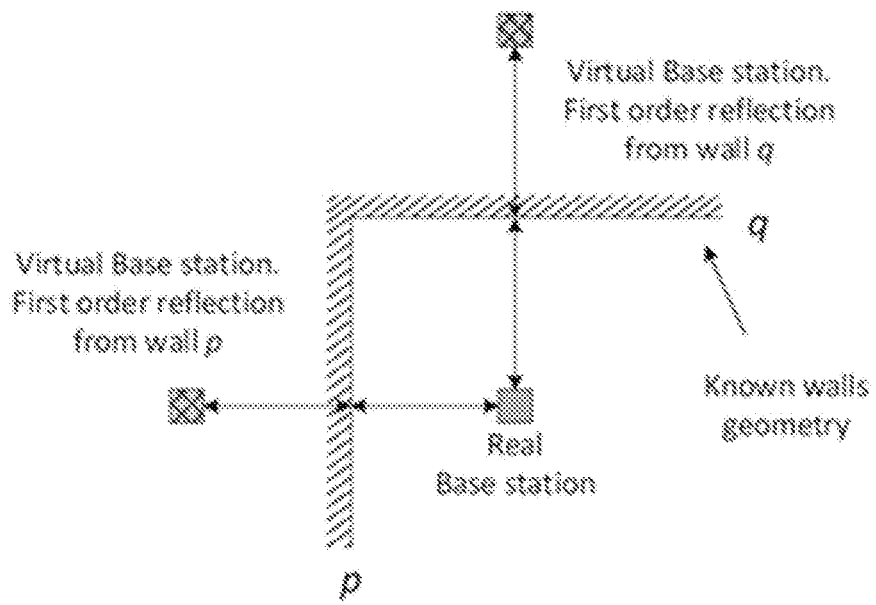
FIG. 4E illustrates an example of virtual base station coordinate calculation based on known deployment geometry in accordance with some embodiments.

The geometry of the building and location of TRPs can be known in advance—a-priori. For instance during the network installation procedure, the coordinates of virtual sources (for 1st, 2nd, etc. reflections) can be calculated explicitly. FIG. 4E illustrates an example of a case when the geometry of walls p and q is known, the coordinates of virtual base stations (i.e. first order reflections) can then be calculated based on the location of real base stations/transmission points that transmit PRS.

Case 2—Unknown Geometry (Map)

Figure 4F:
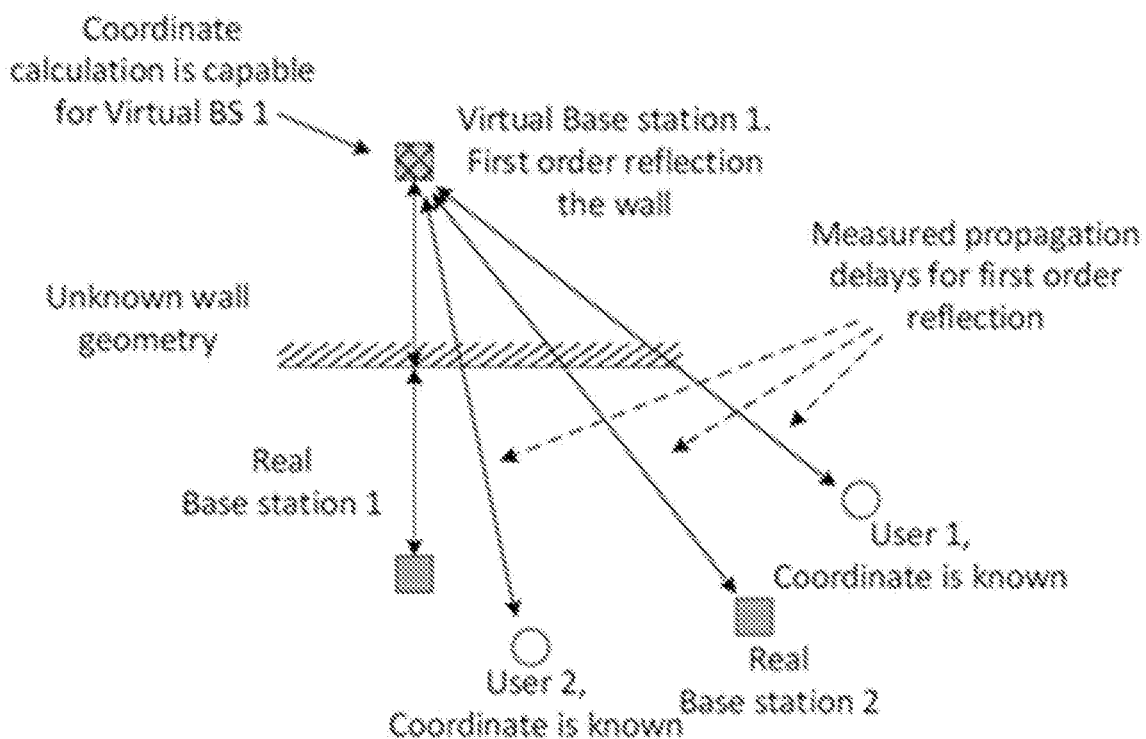
FIG. 4F illustrates an example of virtual base station coordinate calculation based on inter-transmission point measurements in accordance with some embodiments.
Figure 4G:
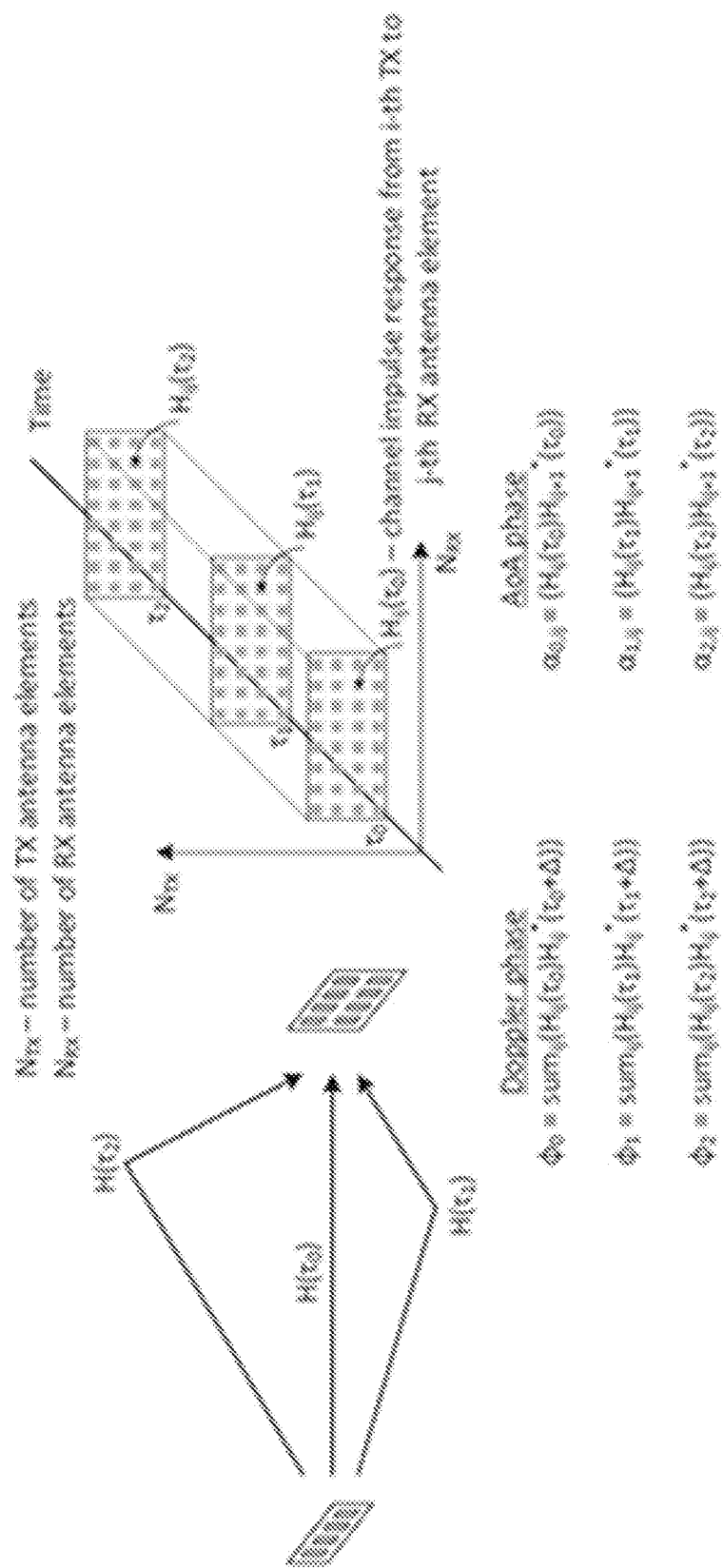
FIG. 4G illustrates an example of measurements of doppler phase and angle of arrival for each path component of a multi-path channel in accordance with some embodiments.

In case the surrounding geometry is unknown, the coordinates of virtual reference sources can be estimated during the PRS transmission/reception between the TPs. Each TP emits PRS and all other TPs receive the signal, and estimate SLPs for each channel component. In case if the number of TPs is enough, the location procedure could be applied to find the coordinate for virtual TP assuming that the SLPs for reflected path are estimated. In this scenario, the TP can be represented by the eNB/gNB or UEs with known coordinates. FIG. 4F illustrates an example of a case when the utilization of coordinates of 3 TPs (e.g., Base station #2 and 2 users) and measured propagation delay for reflected signal on these TPs leads to the capability to calculate the coordinate for virtual base station 1.

In Case 2, the network can autonomously detect location virtual sources through transmission of scanning signals (e.g. beamformed PRSs) and measurements of Angle of Arrivals (AoAs) for different multi-path components. The calibration of antenna arrays and knowledge of their rotation and orientation may also be used. Note that location of TPs and orientation of antennas may be known to TPs.

RAT Dependent Measurements and Reporting

Embodiments herein may have the following impact on RAT dependent positioning and 3GPP specification.

Measurements of Multi-Path Channel Components

A UE may perform measurements of multi-path channel components. In other words, it may report power and timing information not only for the first arrival path but also for other paths in the channel impulse response. The UE may report information about all detected path for each beam (in case of TX beam sweeping) or beam pair (in case of TX-RX beam sweeping). The maximum number of paths to report can be also configured by gNB/network through RRC/LPP/LPPa or NRPP/NRPPa signaling. In addition, a gNB/network can configure criteria to decide which path information can be reported. For instance, a UE can report information for:

First detected arrival path only ($\tau_0$).

First detected arrival path and N strongest multipath components ($\tau_1, \tau_2, \ldots, \tau_N$).

First detected arrival path and paths which power is above predefined threshold that can be defined with respect to the first arrival path power, noise power or path with a peak power or overall channel impulse response power for given beam index or beam index pair.

Measurements of Angle of Arrival (AoA) for Each Path of Multi-Path Channel Impulse Response In case of MIMO transmission and utilization of antenna arrays and/or panels with antenna arrays UE or gNB can also measure the angle of arrival for each component of multipath channel by analyzing phase difference between corresponding antenna array elements observed for each path component ($\alpha(\tau 0), \alpha(\tau 1), \alpha(\tau 2), \ldots, \alpha(\tau N)$). Depending on antenna configuration the elevation and azimuth angles can be measured by UE and/gNB. The angular information can provide additional spatial information and can be used to position the UE if antenna array orientation is known, which is always the case at least for gNB. The spatial orientation of UE antennas can be also know from the external sources.

Measurements of Doppler Components for Each Path of Multi-Path Channel Impulse Response On top of timing and angular information for each path, UE can also measure Doppler (phase offset) for each path component of multipath channel. The Doppler phase ($\varphi(\tau 0)$, $\varphi(\tau 1), \varphi(\tau 2), \ldots, \varphi(\tau N)$) can be measured as a phase difference between two consecutive estimates of channel impulse responses. These measurements can provide additional information on velocity of the target UEs. FIG. 4F illustrates an example of determining virtual base station coordinates based on inter-TP measurements.

Reference Beam and Reference Cell

In case of TDOA based operation for UE positioning, UE may be configured with the reference cell and reference beam (in case of TX beam sweeping) or reference beam pair (in case of TX-RX beam sweeping), which timing (timing of the 1st arrival path can be used for calculation of reference signal time difference (RSTD)).

Inter-beam RSTD and intra-beam RSTD values can be defined with respect to the reference beam timing (e.g. first arrival path of the reference beam and reference cell) or reference beam pair within a reference cell.

The notion of beam can be replaced with a notion of antenna port.

The following reference can be introduced for TDOA operation:

Reference TX beam. This reference TX beam from a given cell can be either determined by UE and reported to gNB/network as a result of beam management on positioning reference signals (or other reference signals such as PSS/SSS, CSI-RS, SRS, etc.) or directly assigned by gNB/network for UE operation. Alternatively this beam can be determined autonomously by UE based on preconfigured by gNB/network criteria. For instance, SSB index of synchronization signals or CSI-RS/PRS resource indexes can be used to indicate beam related information.

Reference TX-RX beam pair. This reference beam-pair from a given cell can be either determined by UE and reported to gNB/network as a result of beam management on positioning reference signals (or other reference signals such as PSS/SSS, CSI-RS, SRS, PRACH, etc.) or directly assigned by gNB/network for UE operation. Alternatively this beam-pair can be determined autonomously by UE based on preconfigured by gNB/network criteria.

Reference cell. Given that each cell can have multiple beams it may also be determined beam of which cell is used as a reference (i.e. reference cell) for RSTD measurements.

Intra-Beam, Inter-Beam and Inter-Cell RSTD Measurements

The following measurements can be additionally introduced into NR specification to capture RSTD:

Inter-beam RSTD measurements (captures relative timing of first arrival path for a given beam/beam pair with respect to the first arrival path of the reference beam/beam pair)

herein may cover scenarios where one cell has multiple TPs and each TP has one or multiple associated beams Intra-beam RSTD measurements (captures relative timing of multipath components within a given beam with respect to the first arrival path of the given beam/beam pair or reference beam/beam pair)

Inter-cell RSTD measurements, if beams are quasi-collocated it may be also possible to configure UE to perform RSTD measurements by processing timing information from all beams of a given cell Note that embodiments herein may assume that inter-beam RSTD measurement also covers the case when TX beams belong to different cells, i.e. inter-cell inter-beam RSTD measurements. In addition, a beam may refer to reference signals transmitted on corresponding resource/port that belong to certain type of reference signals (e.g. SSS/PSS, CSI-RS, PRS, etc.).

Reporting and Configuration

UE is configured with reference cell and reference beam or beam pair or reference cell ID, reference resource index of reference signals.

UE is configured with RSTD reporting mechanism (periodic or even triggered)

Figure 4H:
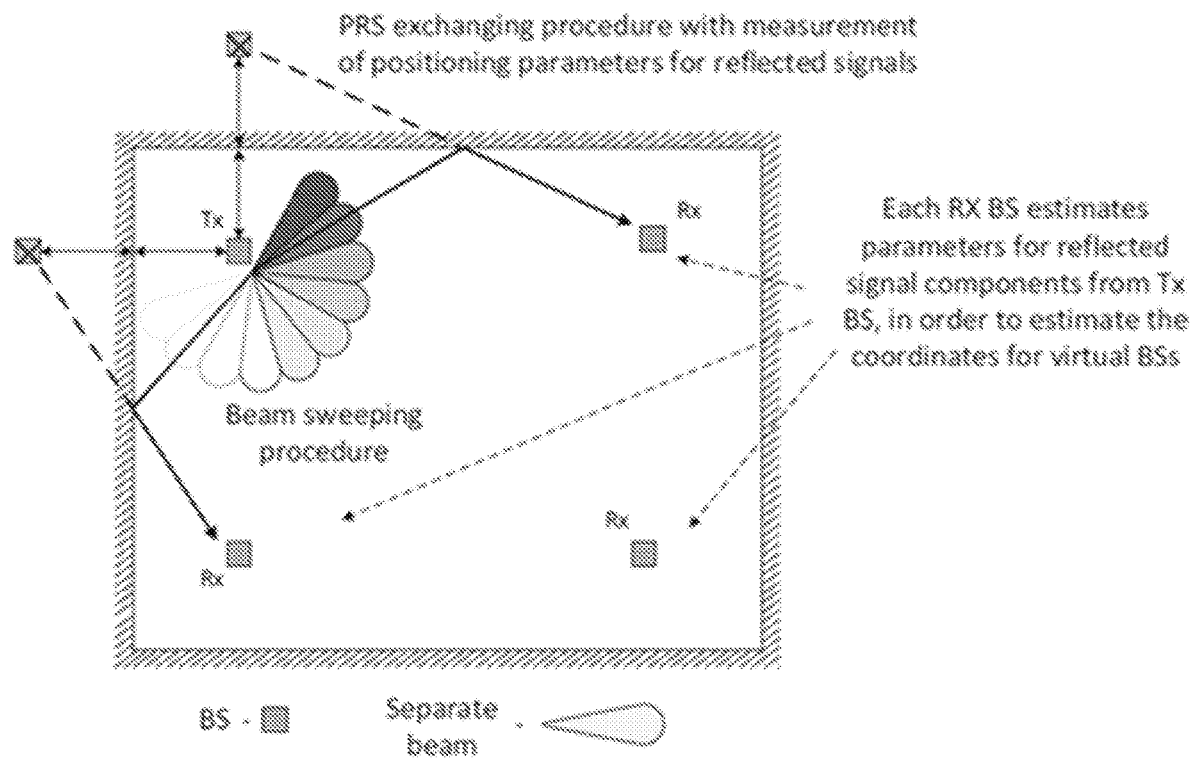
FIG. 4H illustrates a procedure for virtual base station calculation based on deployed transmission points in accordance with some embodiments.

UE performs one or several types of RSTD measurements based on configuration: inter-beam/intra-beam and inter-cell RSTD measurements Procedure for Detection of Virtual Reference Sources In order to determine virtual reference sources, embodiments herein may assume that deployed transmission points (TPs) precisely know their coordinates and antenna system orientation. TPs can sequentially perform TX and RX beam sweeping to estimate propagation delays and AoA/AoD angles for all multi-path components. The predefined schedule can be used for PRS transmission reception from each TP. The combination of AoA/AoD information and known coordinates of TPs can be used to detect positions of virtual reference nodes through multi-path measurements. In order to conduct inter-TP measurements the beamformed PRSs can be used in combination with intelligent beam-management procedure. The procedure for determining virtual sources may be out of scope of 3GPP specification itself and can be done in vendor specific manner however UE/network may know parameters of virtual sources for positioning in case of UE-based or UE-assisted positioning. FIG. 4H illustrates an example of determining virtual base stations based on deployed transmission points.

RAT Independent Measurements and Reporting

In embodiments, additional information may be shared by UE with a location entity responsible for calculation/estimation of UE coordinate for given timestamp:

Measurements

The measurements discussed in this section are RAT-independent and are done by other technologies/devices (e.g. Global Navigation Satellite System (GNSS) receivers, Barometers, Speed meters, Accelerometers, Inertial Measurement Units, Sensors, etc.).

For RAT independent measurements, UE can be configured with conditions that can trigger reporting of the certain information or periodically provide update to the network with preconfigured period for reporting.

Reporting

The following information can be incorporated into the information elements (IEs) of LPP/LPPa/NPP/NPPa or RRC signaling protocols to assist UE positioning:

Physical Coordinate Information
   In 2D or 3D format and represented in any system of coordinates (e.g. local or global coordinate systems, cartesian or spherical, etc): longitude, latitude, altitude (and the sign of latitude, altitude) and metric characterizing their uncertainty/error (e.g. error standard deviation)
   In absolute or relative (differential) form with respect to reference point and values from the previously reported time instance
   UE can indicate technology used to estimate coordinate or report for given technology, e.g. GPS, GNSS, TBS, INS Velocity Vector Information (absolute or relative with respect to reference point)
   In 2D and 3D format and represented in any system of coordinates (e.g. local or global coordinate systems, cartesian or spherical, etc) including horizontal and vertical velocity/speed and metric characterizing their uncertainty/error (e.g. error standard deviation)
   In absolute or relative (differential) form with respect to reference point and values from previously reported time instance
   UE can indicate technology used to estimate velocity vector or report for given technology e.g. GPS, GNSS, TBS, speed meter, etc.

Acceleration Vector Information
   In 2D and 3D format and represented in any system of coordinates (e.g. local or global coordinate systems, cartesian or spherical, etc) including horizontal and vertical acceleration and metric characterizing its uncertainty/error (e.g. error standard deviation)
   In absolute or relative (differential) form with respect to reference point and values from previously reported time instance
   UE can indicate technology used to estimate acceleration vector or report for given technology e.g. GPS, GNSS, TBS, accelerometer, etc.

Direction of Travel
   3 dimensional movement direction
   3 dimensional gyroscope measurements for 3D space orientation Relative Distance Travelled
   If UE can measure relative distance travelled among to timestamps then this information can be also useful for positioning Timestamp Information
   In predefined time-stamp format with relative or absolute time stamp values Inclinometer data (tilt measurement)

Altitude sensor data (e.g. barometer data)

Magnetometer data

Different weather condition sensors (pressure, humidity, temperature, etc.)

Different control parameters like driving wheel rotation (for vehicles), engine traction (for drones) and etc.

Figure 5:
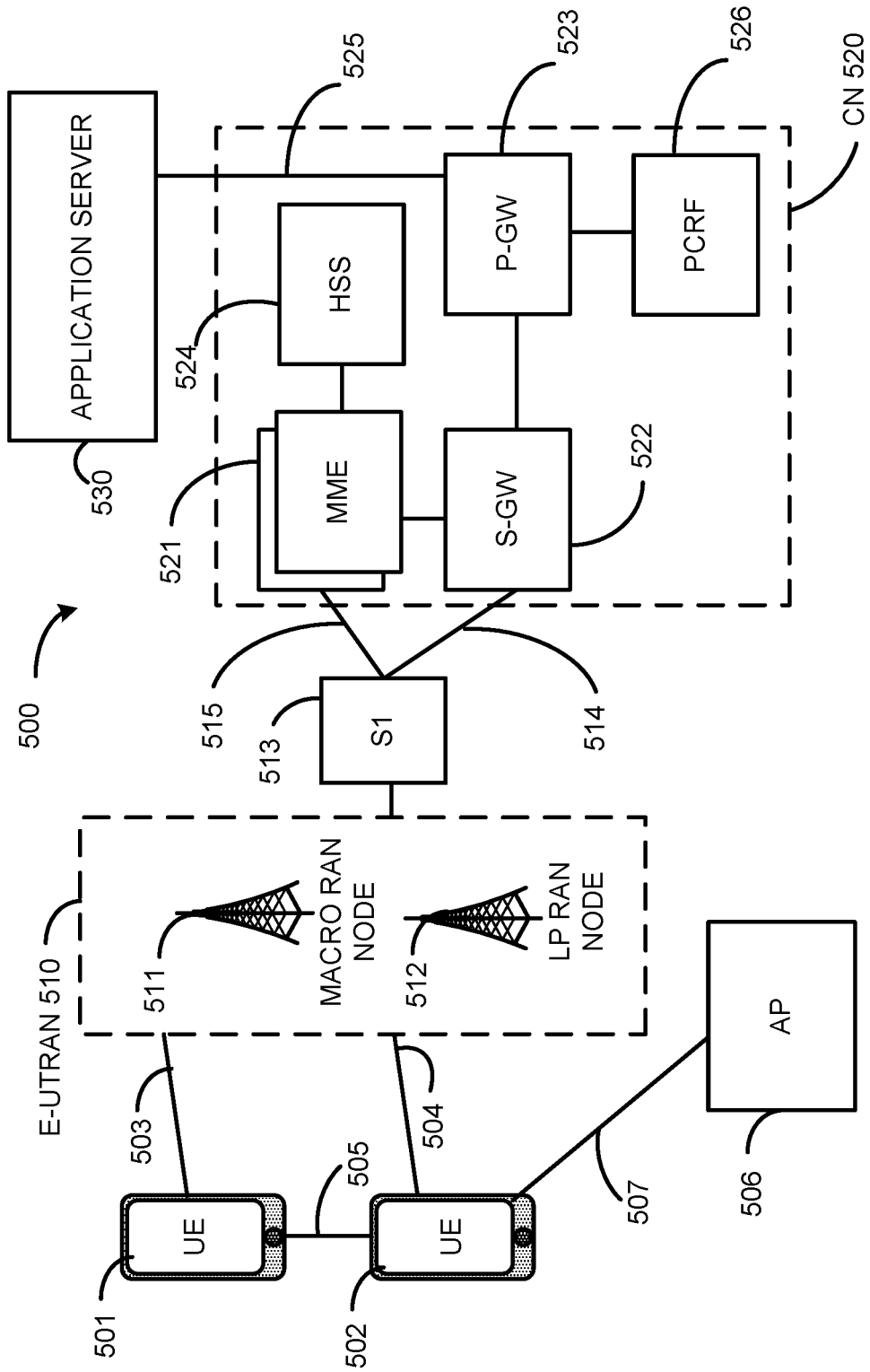
FIG. 5 depicts an architecture of a system of a network in accordance with some embodiments.

FIG. 5 illustrates an architecture of a system 500 of a network in accordance with some embodiments. The system 500 is shown to include a user equipment (UE) 501 and a UE 502. The UEs 501 and 502 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 501 and 502 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 and 502 may be configured to connect, e.g., communicatively couple, with a radio access network (RAN) 510—the RAN 510 may be, for example, an Evolved Universal Mobile Telecommunications System (UMTS) Terrestrial Radio Access Network (E-UTRAN), a NextGen RAN (NG RAN), or some other type of RAN. The UEs 501 and 502 utilize connections 503 and 504, respectively, each of which comprises a physical communications interface or layer (discussed in further detail below); in this example, the connections 503 and 504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 501 and 502 may further directly exchange communication data via a ProSe interface 505. The ProSe interface 505 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 502 is shown to be configured to access an access point (AP) 506 via connection 507. The connection 507 can comprise a local wireless connection, such as a connection consistent with any IEEE 802.11 protocol, wherein the AP 506 would comprise a wireless fidelity (WiFi®) router. In this example, the AP 506 is shown to be connected to the Internet without connecting to the core network of the wireless system (described in further detail below).

The RAN 510 can include one or more access nodes that enable the connections 503 and 504. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 510 may include one or more RAN nodes for providing macrocells, e.g., macro RAN node 511, and one or more RAN nodes for providing femtocells or picocells (e.g., cells having smaller coverage areas, smaller user capacity, or higher bandwidth compared to macrocells), e.g., low power (LP) RAN node 512.

Any of the RAN nodes 511 and 512 can terminate the air interface protocol and can be the first point of contact for the UEs 501 and 502. In some embodiments, any of the RAN nodes 511 and 512 can fulfill various logical functions for the RAN 510 including, but not limited to, radio network controller (RNC) functions such as radio bearer management, uplink and downlink dynamic radio resource management and data packet scheduling, and mobility management.

In accordance with some embodiments, the UEs 501 and 502 can be configured to communicate using Orthogonal Frequency-Division Multiplexing (OFDM) communication signals with each other or with any of the RAN nodes 511 and 512 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 and 512 to the UEs 501 and 502, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 501 and 502. The physical downlink control channel (PDCCH) may carry information about the transport format and resource allocations related to the PDSCH channel, among other things. It may also inform the UEs 501 and 502 about the transport format, resource allocation, and H-ARQ (Hybrid Automatic Repeat Request) information related to the uplink shared channel. Typically, downlink scheduling (assigning control and shared channel resource blocks to the UE 502 within a cell) may be performed at any of the RAN nodes 511 and 512 based on channel quality information fed back from any of the UEs 501 and 502. The downlink resource assignment information may be sent on the PDCCH used for (e.g., assigned to) each of the UEs 501 and 502.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as enhanced resource element groups (EREGs). An ECCE may have other numbers of EREGs in some situations.

The RAN 510 is shown to be communicatively coupled to a core network (CN) 520—via an S1 interface 513. In embodiments, the CN 520 may be an evolved packet core (EPC) network, a NextGen Packet Core (NPC) network, or some other type of CN. In this embodiment, the S1 interface 513 is split into two parts: the S1-U interface 514, which carries traffic data between the RAN nodes 511 and 512 and the serving gateway (S-GW) 522, and the S1-mobility management entity (MME) interface 515, which is a signaling interface between the RAN nodes 511 and 512 and MMEs 521.

In this embodiment, the CN 520 comprises the MMEs 521, the S-GW 522, the Packet Data Network (PDN) Gateway (P-GW) 523, and a home subscriber server (HSS) 524. The MMEs 521 may be similar in function to the control plane of legacy Serving General Packet Radio Service (GPRS) Support Nodes (SGSN). The MMEs 521 may manage mobility aspects in access such as gateway selection and tracking area list management. The HSS 524 may comprise a database for network users, including subscription-related information to support the network entities' handling of communication sessions. The CN 520 may comprise one or several HSSs 524, depending on the number of mobile subscribers, on the capacity of the equipment, on the organization of the network, etc. For example, the HSS 524 can provide support for routing/roaming, authentication, authorization, naming/addressing resolution, location dependencies, etc.

The S-GW 522 may terminate the S1 interface 513 towards the RAN 510, and routes data packets between the RAN 510 and the CN 520. In addition, the S-GW 522 may be a local mobility anchor point for inter-RAN node handovers and also may provide an anchor for inter-3GPP mobility. Other responsibilities may include lawful intercept, charging, and some policy enforcement.

The P-GW 523 may terminate an SGi interface toward a PDN. The P-GW 523 may route data packets between the EPC network and external networks such as a network including the application server 530 (alternatively referred to as application function (AF)) via an Internet Protocol (IP) interface 525. Generally, the application server 530 may be an element offering applications that use IP bearer resources with the core network (e.g., UMTS Packet Services (PS) domain, LTE PS data services, etc.). In this embodiment, the P-GW 523 is shown to be communicatively coupled to an application server 530 via an IP communications interface 525. The application server 530 can also be configured to support one or more communication services (e.g., Voice-over-Internet Protocol (VoIP) sessions, PTT sessions, group communication sessions, social networking services, etc.) for the UEs 501 and 502 via the CN 520.

The P-GW 523 may further be a node for policy enforcement and charging data collection. Policy and Charging Enforcement Function (PCRF) 526 is the policy and charging control element of the CN 520. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 526 may be communicatively coupled to the application server 530 via the P-GW 523. The application server 530 may signal the PCRF 526 to indicate a new service flow and select the appropriate Quality of Service (QoS) and charging parameters. The PCRF 526 may provision this rule into a Policy and Charging Enforcement Function (PCEF) (not shown) with the appropriate traffic flow template (TFT) and QoS class of identifier (QCI), which commences the QoS and charging as specified by the application server 530.

Figure 6:
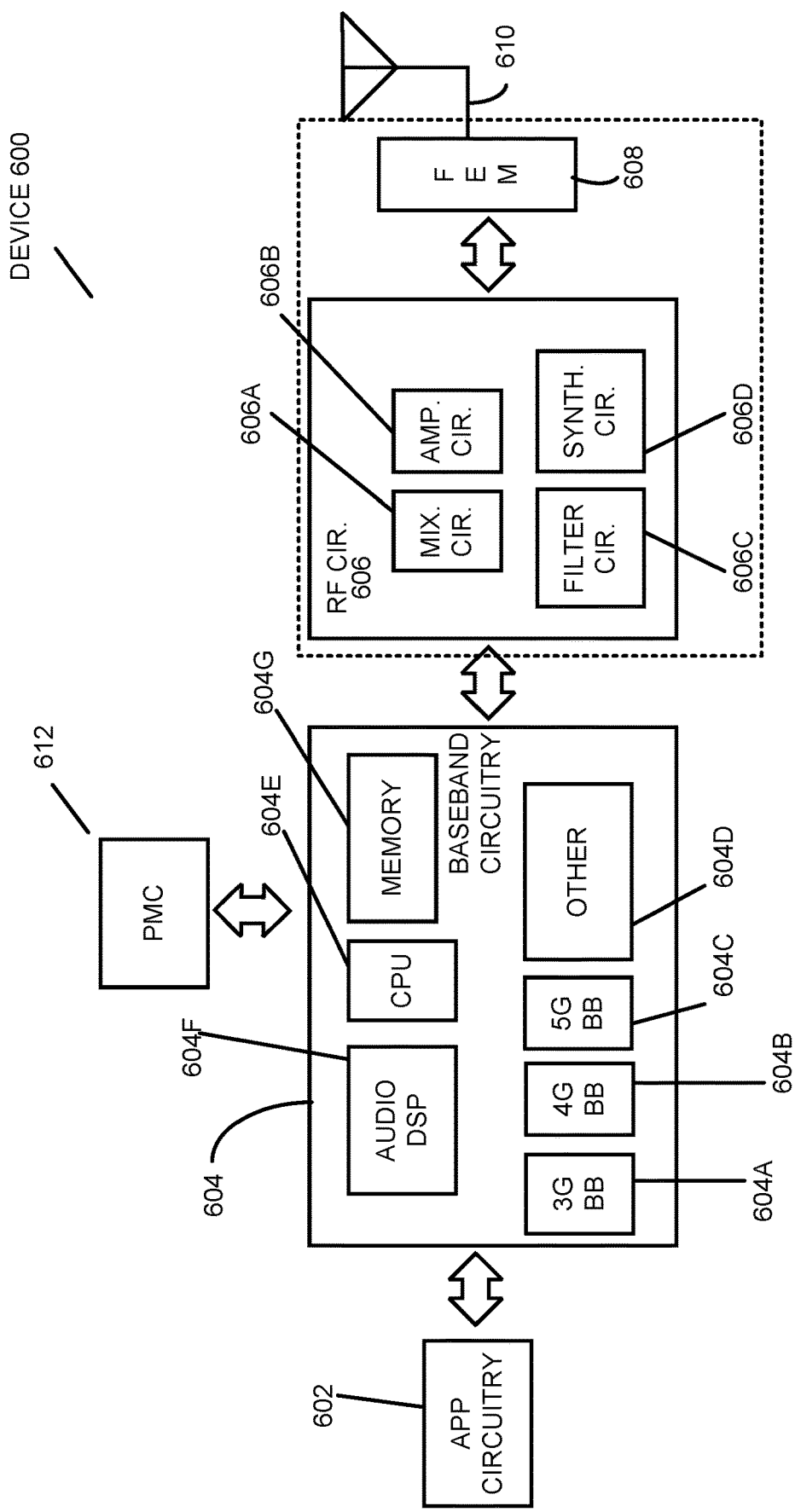
FIG. 6 depicts an example of components of a device in accordance with some embodiments.

FIG. 6 illustrates example components of a device 600 in accordance with some embodiments. In some embodiments, the device 600 may include application circuitry 602, baseband circuitry 604, Radio Frequency (RF) circuitry 606, front-end module (FEM) circuitry 608, one or more antennas 610, and power management circuitry (PMC) 612 coupled together at least as shown. The components of the illustrated device 600 may be included in a UE or a RAN node. In some embodiments, the device 600 may include fewer elements (e.g., a RAN node may not utilize application circuitry 602, and instead include a processor/controller to process IP data received from an EPC). In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 600. In some embodiments, processors of application circuitry 602 may process IP data packets received from an EPC.

The baseband circuitry 604 may include circuitry such as, but not limited to, one or more single-core or multi-core processors. The baseband circuitry 604 may include one or more baseband processors or control logic to process baseband signals received from a receive signal path of the RF circuitry 606 and to generate baseband signals for a transmit signal path of the RF circuitry 606. Baseband processing circuitry 604 may interface with the application circuitry 602 for generation and processing of the baseband signals and for controlling operations of the RF circuitry 606. For example, in some embodiments, the baseband circuitry 604 may include a third generation (3G) baseband processor 604A, a fourth generation (4G) baseband processor 604B, a fifth generation (5G) baseband processor 604C, or other baseband processor(s) 604D for other existing generations, generations in development or to be developed in the future (e.g., second generation (2G), sixth generation (6G), etc.). The baseband circuitry 604 (e.g., one or more of baseband processors 604A-D) may handle various radio control functions that enable communication with one or more radio networks via the RF circuitry 606. In other embodiments, some or all of the functionality of baseband processors 604A-D may be included in modules stored in the memory 604G and executed via a Central Processing Unit (CPU) 604E. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, or constellation mapping/demapping functionality. In some embodiments, encoding/decoding circuitry of the baseband circuitry 604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include one or more audio digital signal processor(s) (DSP) 604F. The audio DSP(s) 604F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the receive signal path of the RF circuitry 606 may include mixer circuitry 606a, amplifier circuitry 606b and filter circuitry 606c. In some embodiments, the transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c.

In some embodiments, the mixer circuitry 606a of the receive signal path and the mixer circuitry 606a of the transmit signal path may include two or more mixers and may be arranged for quadrature downconversion and upconversion, respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a of the transmit signal path may be arranged for direct downconversion and direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage controlled oscillator (VCO), although that is not a requirement. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path, which may include circuitry configured to operate on RF signals received from one or more antennas 610, amplify the received signals and provide the amplified versions of the received signals to the RF circuitry 606 for further processing. FEM circuitry 608 may also include a transmit signal path, which may include circuitry configured to amplify signals for transmission provided by the RF circuitry 606 for transmission by one or more of the one or more antennas 610. In various embodiments, the amplification through the transmit or receive signal paths may be done solely in the RF circuitry 606, solely in the FEM 608, or in both the RF circuitry 606 and the FEM 608.

In some embodiments, the FEM circuitry 608 may include a TX/RX switch to switch between transmit mode and receive mode operation. The FEM circuitry 608 may include a receive signal path and a transmit signal path. The receive signal path of the FEM circuitry 608 may include a low noise amplifier (LNA) to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610).

In some embodiments, the PMC 612 may manage power provided to the baseband circuitry 604. In particular, the PMC 612 may control power-source selection, voltage scaling, battery charging, or DC-to-DC conversion. The PMC 612 may often be included when the device 600 is capable of being powered by a battery, for example, when the device is included in a UE. The PMC 612 may increase the power conversion efficiency while providing desirable implementation size and heat dissipation characteristics.

FIG. 6 shows the PMC 612 coupled only with the baseband circuitry 604. However, in other embodiments, the PMC 612 may be additionally or alternatively coupled with, and perform similar power management operations for, other components such as, but not limited to, application circuitry 602, RF circuitry 606, or FEM 608.

In some embodiments, the PMC 612 may control, or otherwise be part of, various power saving mechanisms of the device 600. For example, if the device 600 is in an RRC_Connected state, where it is still connected to the RAN node as it expects to receive traffic shortly, then it may enter a state known as Discontinuous Reception Mode (DRX) after a period of inactivity. During this state, the device 600 may power down for brief intervals of time and thus save power.

If there is no data traffic activity for an extended period of time, then the device 600 may transition off to an RRC_Idle state, where it disconnects from the network and does not perform operations such as channel quality feedback, handover, etc. The device 600 goes into a very low power state and it performs paging where again it periodically wakes up to listen to the network and then powers down again. The device 600 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 602 and processors of the baseband circuitry 604 may be used to execute elements of one or more instances of a protocol stack. For example, processors of the baseband circuitry 604, alone or in combination, may be used to execute Layer 3, Layer 2, or Layer 1 functionality, while processors of the application circuitry 602 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 7:
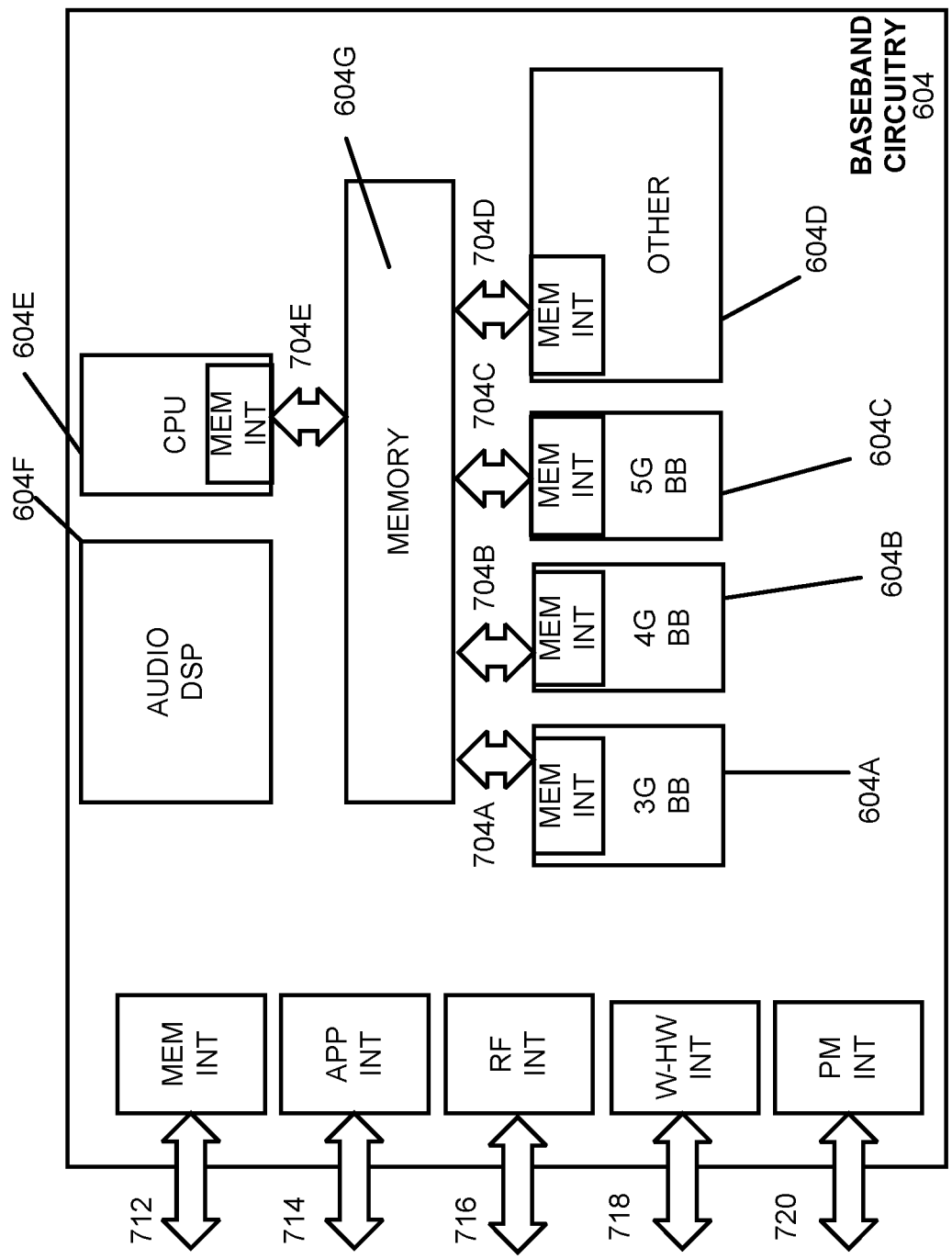
FIG. 7 depicts an example of interfaces of baseband circuitry in accordance with some embodiments.

FIG. 7 illustrates example interfaces of baseband circuitry in accordance with some embodiments. As discussed above, the baseband circuitry 604 of FIG. 6 may comprise processors 604A-604E and a memory 604G utilized by said processors. Each of the processors 604A-604E may include a memory interface, 704A-704E, respectively, to send/receive data to/from the memory 604G.

The baseband circuitry 604 may further include one or more interfaces to communicatively couple to other circuitries/devices, such as a memory interface 712 (e.g., an interface to send/receive data to/from memory external to the baseband circuitry 604), an application circuitry interface 714 (e.g., an interface to send/receive data to/from the application circuitry 602 of FIG. 6), an RF circuitry interface 716 (e.g., an interface to send/receive data to/from RF circuitry 606 of FIG. 6), a wireless hardware connectivity interface 718 (e.g., an interface to send/receive data to/from Near Field Communication (NFC) components, Bluetooth® components (e.g., Bluetooth® Low Energy), Wi-Fi® components, and other communication components), and a power management interface 720 (e.g., an interface to send/receive power or control signals to/from the PMC 612.

Figure 8:
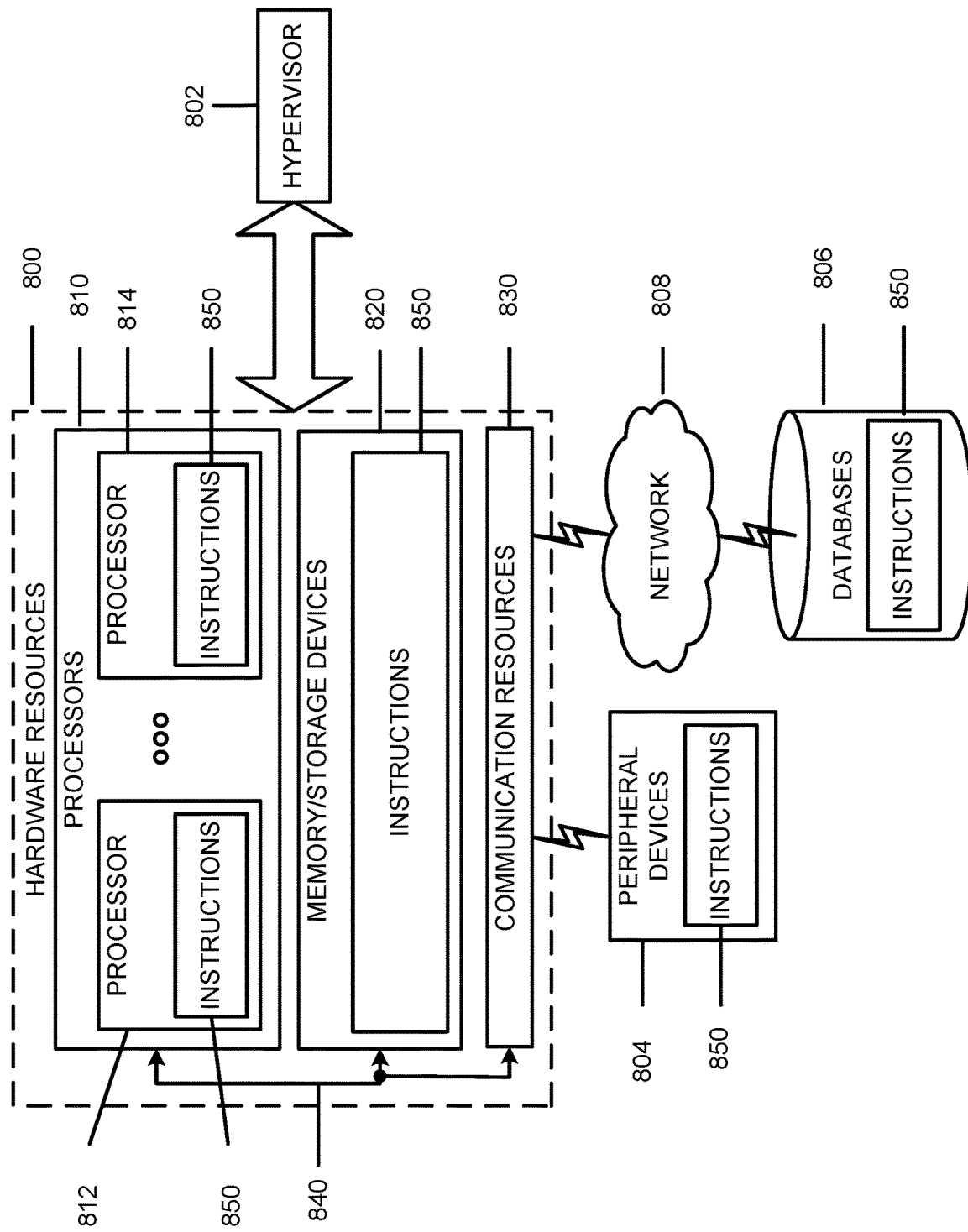
FIG. 8 depicts a block diagram illustrating components, according to some embodiments, able to read instructions from a machine-readable or computer-readable medium (e.g., a non-transitory machine-readable storage medium) and perform any one or more of the methodologies discussed herein.

FIG. 8 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840. For embodiments where node virtualization (e.g., NFV) is utilized, a hypervisor 802 may be executed to provide an execution environment for one or more network slices/sub-slices to utilize the hardware resources 800.

The processors 810 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 812 and a processor 814.

The memory/storage devices 820 may include main memory, disk storage, or any suitable combination thereof. The memory/storage devices 820 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 830 may include interconnection or network interface components or other suitable devices to communicate with one or more peripheral devices 804 or one or more databases 806 via a network 808. For example, the communication resources 830 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

Figure 3:
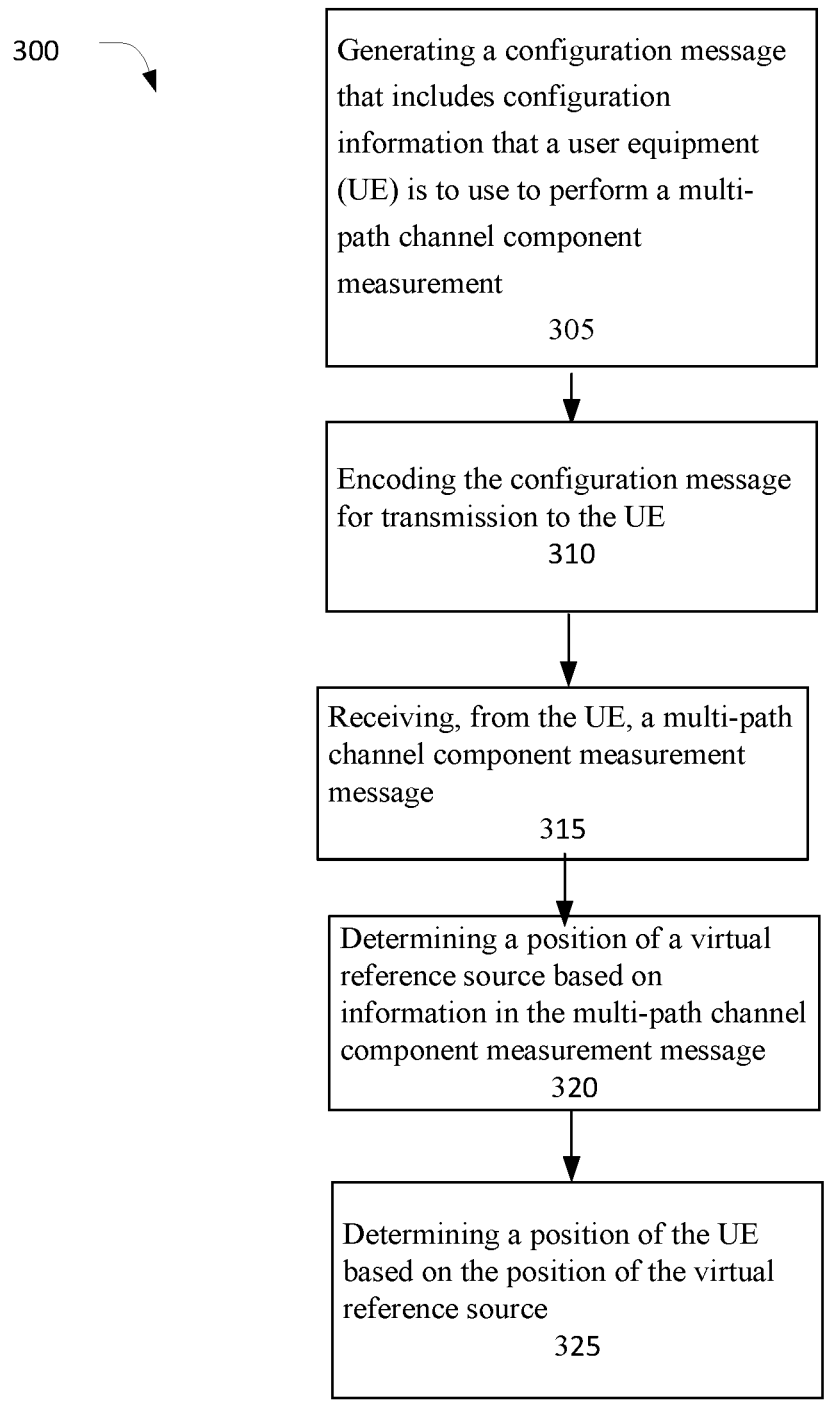

In various embodiments, the devices/components of FIGS. 5-8, and particularly the baseband circuitry of FIG. 7, may be used to practice, in whole or in part, any of the operation flow/algorithmic structures depicted in FIGS. 1-3.

One example of an operation flow/algorithmic structure is depicted in FIG. 1, which may be performed by a next-generation NodeB (gNB) in accordance with some embodiments. In this example, operation flow/algorithmic structure 100 may include, at 105, retrieving, from memory, configuration information that a user equipment (UE) is to use to perform a multi-path channel component measurement. Operation flow/algorithmic structure 100 may further include, at 110, generating a message that includes the configuration information. Operation flow/algorithmic structure 100 may further include, at 115, encoding the message for transmission to the UE. Operation flow/algorithmic structure 100 may further include, at 120, receiving, from the UE, a multi-path channel component measurement. Operation flow/algorithmic structure 100 may further include, at 125, determining a position of a virtual reference source based on the multi-path channel component measurement. Operation flow/algorithmic structure 100 may further include, at 130, determining a position of the UE based on the position of the virtual reference source.

Another example of an operation flow/algorithmic structure is depicted in FIG. 2, which may be performed by UE in accordance with some embodiments. In this example, operation flow/algorithmic structure 200 may include, at 205, receiving a configuration message that includes configuration information to use to perform a multi-path channel component measurement. Operation flow/algorithmic structure 200 may further include, at 210, performing the multi-path channel component measurement based on the configuration information. Operation flow/algorithmic structure 200 may further include, at 215, encoding a message for transmission comprising information regarding the multi-path channel component that includes a signal location parameter (SLP), wherein the SLP is: a time of arrival (TOA) parameter, a time difference of arrival (TDOA) parameter, a propagation time, an angle of arrival, an angle of departure, or a reference signal power level.

Another example of an operation flow/algorithmic structure is depicted in FIG. 3, which may be performed by gNB in accordance with some embodiments. In this example, operation flow/algorithmic structure 300 may include, at 305, generating a configuration message that includes configuration information that a user equipment (UE) is to use to perform a multi-path channel component measurement. Operation flow/algorithmic structure 300 may further include, at 310, encoding the configuration message for transmission to the UE. Operation flow/algorithmic structure 300 may further include, at 315, receiving, from the UE, a multi-path channel component measurement message. Operation flow/algorithmic structure 300 may further include, at 320, determining a position of a virtual reference source based on information in the multi-path channel component measurement message. Operation flow/algorithmic structure 300 may further include, at 325, determining a position of the UE based on the position of the virtual reference source.

EXAMPLES

Some non-limiting examples are provided below.

Example 1 includes an apparatus comprising: memory to store configuration information that a user equipment (UE) is to use to perform a multi-path channel component measurement; and processing circuitry, coupled with the memory, to: retrieve the configuration information from the memory; generate a message that includes the configuration information; encode the message for transmission to the UE; receive, from the UE, a multi-path channel component measurement; determine a position of a virtual reference source based on the multi-path channel component measurement; and determine a position of the UE based on the position of the virtual reference source.

Example 2 includes the apparatus of example 1 or some other example herein, wherein the message is to be transmitted via radio resource control (RRC) signaling, long-term evolution positioning protocol (LPP) signaling LPP annex (LPPa) signaling, or new radio positioning protocol (NRPP) signaling.

Example 3 includes the apparatus of example 1 or some other example herein, wherein the configuration information is to cause the UE to determine: a first detected arrival path, a strongest multipath component, or a path having a power level above a predetermined threshold.

Example 4 includes the apparatus of example 1 or some other example herein, wherein the configuration information is to cause the UE to determine an angle of arrival (AoA) for each path of a multi-path channel.

Example 5 includes the apparatus of example 1 or some other example herein, wherein the configuration information is to cause the UE to determine a phase offset for each path of a multi-path channel.

Example 6 includes the apparatus of example 1 or some other example herein, wherein the configuration information is to identify a reference cell and reference beam for transmission (TX) beam sweeping, or a reference beam for transmission-receiving (TX-RX) beam sweeping.

Example 7 includes the apparatus of example 1 or some other example herein, wherein the multi-path channel component measurement includes a signal location parameter (SLP), and wherein the SLP is: a time of arrival (TOA) parameter, a time difference of arrival (TDOA) parameter, a propagation time, an angle of arrival, an angle of departure, or a reference signal power level.

Example 8 includes the apparatus of example 1 or some other example herein, wherein the multi-path channel component measurement includes a measurement for a signal received directly by the UE from a base station, and a measurement for a signal received by the UE from the base station after being reflected from an object.

Example 9 includes the apparatus of example 8 or some other example herein, wherein the position of the virtual reference source is determined based on measurement for the reflected signal.

Example 10 includes one or more computer-readable media storing instructions, that, when executed by one or more processors, cause a user equipment (UE) to: receive a configuration message that includes configuration information to use to perform a multi-path channel component measurement; perform the multi-path channel component measurement based on the configuration information; and encode a message for transmission comprising information regarding the multi-path channel component that includes a signal location parameter (SLP), wherein the SLP is: a time of arrival (TOA) parameter, a time difference of arrival (TDOA) parameter, a propagation time, an angle of arrival, an angle of departure, or a reference signal power level.

Example 11 includes the one or more computer-readable media of example 10 or some other example herein, wherein the configuration message is received via radio resource control (RRC) signaling, long-term evolution positioning protocol (LPP) signaling LPP annex (LPPa) signaling, or new radio positioning protocol (NRPP) signaling.

Example 12 includes the one or more computer-readable media of example 10 or some other example herein, wherein the configuration information is to cause the UE to determine: a first detected arrival path, a strongest multipath component, or a path having a power level above a predetermined threshold.

Example 13 includes the one or more computer-readable media of example 10 or some other example herein, wherein the configuration information is to cause the UE to determine an angle of arrival (AoA) for each path of a multi-path channel.

Example 14 includes the one or more computer-readable media of example 10 or some other example herein, wherein the configuration information is to cause the UE to determine a phase offset for each path of a multi-path channel.

Example 15 includes the one or more computer-readable media of example 10 or some other example herein, wherein the configuration information is to identify a reference cell and reference beam for transmission (TX) beam sweeping, or a reference beam for transmission-receiving (TX-RX) beam sweeping.

Example 16 includes the one or more computer-readable media of example 10 or some other example herein, wherein the multi-path channel component measurement information includes a measurement for a signal received directly by the UE from a base station, and a measurement for a signal received by the UE from the base station after being reflected from an object.

Example 17 includes one or more computer-readable media storing instructions, that, when executed by one or more processors, cause a next-generation NodeB (gNB) to: generate a configuration message that includes configuration information that a user equipment (UE) is to use to perform a multi-path channel component measurement; encode the configuration message for transmission to the UE; receive, from the UE, a multi-path channel component measurement message; determine a position of a virtual reference source based on information in the multi-path channel component measurement message; and determine a position of the UE based on the position of the virtual reference source.

Example 18 includes the one or more computer-readable media of example 17 or some other example herein, wherein the message is to be transmitted via radio resource control (RRC) signaling, long-term evolution positioning protocol (LPP) signaling LPP annex (LPPa) signaling, or new radio positioning protocol (NRPP) signaling.

Example 19 includes the one or more computer-readable media of example 17 or some other example herein, wherein the configuration information is to cause the UE to determine: a first detected arrival path, a strongest multipath component, a path having a power level above a predetermined threshold, an angle of arrival (AoA) for each path of a multi-path channel, a phase offset for each path of a multi-path channel, a reference cell and reference beam for transmission (TX) beam sweeping, or a reference beam for transmission-receiving (TX-RX) beam sweeping.

Example 20 includes the one or more computer-readable media of example 17 or some other example herein, wherein the multi-path channel component measurement includes a measurement for a signal received directly by the UE from a base station and a measurement for a signal received by the UE from the base station after being reflected from an object, and wherein the position of the virtual reference source is determined based on measurement for the reflected signal.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, and/or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a method of communicating in a wireless network as shown and described herein.

Example 27 may include a system for providing wireless communication as shown and described herein.

Example 28 may include a device for providing wireless communication as shown and described herein.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure.

What is claimed is:

1. An apparatus comprising:
   a memory to store configuration information that a user equipment (UE) is to use to perform a multi-path channel component measurement; and
   processing circuitry, coupled with the memory, the processing circuitry configured to:
      retrieve the configuration information from the memory;
      generate a message that comprises the configuration information;
      encode the message for transmission to the UE;
      receive, from the UE, the multi-path channel component measurement, wherein:
         the multi-path channel component measurement comprises a first signal location parameter (SLP) for a first signal received directly by the UE from the apparatus and a second SLP for a second signal received by the UE from the apparatus after being reflected from an object,
         the first SLP comprises at least one of a first time of arrival (TOA) parameter, a first time difference of arrival (TDOA) parameter, a first propagation time, a first angle of arrival, a first angle of departure, or a first reference signal power level associated with the first signal, and
         the second SLP comprises at least one of a second TOA parameter, a second TDOA parameter, a second propagation time, a second angle of arrival, a second angle of departure, or a second reference signal power level associated with the second signal;
      determine a position of a virtual reference source based on the multi-path channel component measurement, wherein the determining the position of the virtual reference source comprises determining an absolute coordinate of the virtual reference based on a position of the apparatus and a reflection surface geometry of the object; and
      determine a position of the UE based on the position of the virtual reference source.

2. The apparatus of claim 1, wherein the message is to be transmitted via radio resource control (RRC) signaling, long-term evolution positioning protocol (LPP) signaling, LPP annex (LPPa) signaling, or new radio positioning protocol (NRPP) signaling.

3. The apparatus of claim 1, wherein the configuration information is to cause the UE to determine: a first detected arrival path, a strongest multipath component, or a path having a power level above a predetermined threshold.

4. The apparatus of claim 1, wherein the configuration information is to cause the UE to determine an angle of arrival (AoA) for each path of a multi-path channel.

5. The apparatus of claim 1, wherein the configuration information is to cause the UE to determine a phase offset for each path of a multi-path channel.

6. The apparatus of claim 1, wherein the configuration information is to identify a reference cell and reference beam for transmission (TX) beam sweeping, or a reference beam for transmission-receiving (TX-RX) beam sweeping.

7. The apparatus of claim 1, wherein the position of the virtual reference source is determined based on a measurement for the reflected signal.

8. One or more computer-readable media storing instructions, that, when executed by one or more processors, cause a user equipment (UE) to:
   receive a configuration message that includes configuration information to use to perform a multi-path channel component measurement;
   perform the multi-path channel component measurement based on the configuration information, wherein:
      the multi-path channel component measurement comprises a first signal location parameter (SLP) for a first signal received directly by the UE from a base station and a second SLP for a second signal received by the UE from the base station after being reflected from an object,
      the first SLP comprises at least one of a first time of arrival (TOA) parameter, a first time difference of arrival (TDOA) parameter, a first propagation time, a first angle of arrival, a first angle of departure, or a first reference signal power level associated with the first signal, and
      the second SLP comprises at least one of a second TOA parameter, a second TDOA parameter, a second propagation time, a second angle of arrival, a second angle of departure, or a second reference signal power level associated with the second signal; and
   encode a message for transmission comprising information regarding the multi-path channel component measurement that comprises at least a first signal location parameter (SLP) associated with the first measurement and a second SLP associated with the second measurement, wherein the first SLP and the second SLP comprise a time of arrival (TOA) parameter, a time difference of arrival (TDOA) parameter, a propagation time, an angle of arrival, an angle of departure, or a reference signal power level,
   wherein the multi-path channel component measurement is used to determine an absolute coordinate of the virtual reference based on a position of the base station and a reflection surface geometry of the object.

9. The one or more computer-readable media of claim 8, wherein the instructions cause the UE to receive the configuration message via radio resource control (RRC) signaling, long-term evolution positioning protocol (LPP) signaling, LPP annex (LPPa) signaling, or new radio positioning protocol (NRPP) signaling.

10. The one or more computer-readable media of claim 8, wherein the instructions cause the UE to use the configuration information to determine: a first detected arrival path, a strongest multipath component, or a path having a power level above a predetermined threshold.

11. The one or more computer-readable media of claim 8, wherein the instructions cause the UE to use the configuration information to determine an angle of arrival (AoA) for each path of a multi-path channel.

12. The one or more computer-readable media of claim 8, wherein the instructions cause the UE to use the configuration information to determine a phase offset for each path of a multi-path channel.

13. The one or more computer-readable media of claim 8, wherein the configuration information is to identify a reference cell and reference beam for transmission (TX) beam sweeping, or a reference beam for transmission-receiving (TX-RX) beam sweeping.

14. One or more computer-readable media storing instructions, that, when executed by one or more processors, cause a base station to:
    generate a configuration message that includes configuration information that a user equipment (UE) is to use to perform a multi-path channel component measurement;
    encode the configuration message for transmission to the UE;
    receive, from the UE, the multi-path channel component measurement, wherein:
        the multi-path channel component measurement comprises a first signal location parameter (SLP) for a first signal received directly by the UE from the base station and a second SLP for a second signal received by the UE from the base station after being reflected from an object,
        the first SLP comprises at least one of a first time of arrival (TOA) parameter, a first time difference of arrival (TDOA) parameter, a first propagation time, a first angle of arrival, a first angle of departure, or a first reference signal power level associated with the first signal, and
        the second SLP comprises at least one of a second TOA parameter, a second TDOA parameter, a second propagation time, a second angle of arrival, a second angle of departure, or a second reference signal power level associated with the second signal;
    determine a position of a virtual reference source based on information in the multi-path channel component measurement, wherein the determining the position of the virtual reference source comprises determining an absolute coordinate of the virtual reference based on a position of the base station and a reflection surface geometry of the object; and
    determine a position of the UE based on the position of the virtual reference source.

15. The one or more computer-readable media of claim 14, wherein the message is to be transmitted via radio resource control (RRC) signaling, long-term evolution positioning protocol (LPP) signaling, LPP annex (LPPa) signaling, or new radio positioning protocol (NRPP) signaling.

16. The one or more computer-readable media of claim 14, wherein the configuration information is to cause the UE to determine: a first detected arrival path, a strongest multipath component, a path having a power level above a predetermined threshold, an angle of arrival (AoA) for each path of a multi-path channel, a phase offset for each path of a multi-path channel, a reference cell and reference beam for transmission (TX) beam sweeping, or a reference beam for transmission-receiving (TX-RX) beam sweeping.

17. The one or more computer-readable media of claim 14, wherein the position of the virtual reference source is determined based on a measurement for the reflected signal.

* * * * *